United States Patent
Morgenstern et al.

[15] 3,666,719

[45] May 30, 1972

[54] PROCESS FOR THE PURIFICATION OF POLYMER SOLUTIONS

[72] Inventors: Karl Morgenstern, Krefeld; Hermann Schnell, Krefeld-Uerdingen; Ludwig Bottenbruch, Krefeld-Boekum; Otto Court, Neuss; Hans-Helmut Schwarz, Krefeld-Bochum; Hugo Vernaleken, Krefeld, all of Germany

[73] Assignee: Farbenfabriken Bayer Aktiengesellschaft, Leverkusen, Germany

[22] Filed: Feb. 24, 1970

[21] Appl. No.: 13,853

[30] Foreign Application Priority Data

Mar. 5, 1969  Germany.....................P 19 11 179.6

[52] U.S. Cl. ..............................260/47 XA, 260/96 R

[51] Int. Cl............................................C08g 17/13
[58] Field of Search ..................260/96 R, 47 XA

[56] References Cited

UNITED STATES PATENTS

| | | | |
|---|---|---|---|
| 3,373,145 | 3/1968 | Wagner | 260/96 |
| 3,470,133 | 9/1969 | Ohme | 260/96 |

*Primary Examiner*—Samuel H. Blech
*Attorney*—Burgess, Dinklage & Sprung

[57] ABSTRACT

Polymer solutions are purified with a detergent solution in pulsating columns with perforated bases, in which a proportion by volume of the polymer solution to the detergent solution of $\leq 0.1$ is maintained in the extraction column and the detergent solution is used as the continuous phase.

5 Claims, No Drawings

PROCESS FOR THE PURIFICATION OF POLYMER SOLUTIONS

The present invention relates to a process for the purification of polymer solutions by washing them in a pulsating column which has a perforated base.

Polycondensates which are obtained by phase boundary surface reactions, e.g., polycarbonate obtained by the action of phosgene on bisphenol in the presence of aqueous alkali and organic solvents, often contain unreacted starting materials and salts as impurities derived from the manufacturing process. These substances interfere with subsequent processes and they impair the quality of the end product unless they are completely removed.

It is therefore necessary to free the reaction solution from the impurities by evaporation of the solvent before the polymer is isolated. This removal of impurities is achieved by washing the polymer solution. Suitable devices for carrying out the washing process are, for example, combinations of high speed mixers and high speed centrifuges. These devices are expensive to buy and to maintain and, moreover, it is often necessary to arrange several such devices in a row in order to wash out the impurities completely. Extraction columns, which generally operate more economically and have distinct advantages with regard to their initial running and maintenance costs when compared with the costs when mixer centrifuges are used, have not hitherto been described for use in the extraction of polymer solutions. Their use is often precluded by the tendency of viscous polymer solutions to emulsify with the detergent in the columns. This applies particularly to so-called rotating and pulsating columns. Columns having packing materials, in which the packing materials have to be packed fairly tightly in order to obtain a concentrated and efficient exchange of material, retain the viscous polymer solutions between the packing materials so that no droplets are formed and, therefore, no large surface areas are formed and no exchange of material takes place.

Surprisingly, it has now been found that polymer solutions can be washed in pulsating columns having perforated bases if the proportion by volume of polymer solution to detergent solution in the extraction column is maintained at ≤ 0.1 and the detergent solution is used as the continuous phase.

In this case, no blockage occurs due to an accumulation of polymer solution on the perforated base and the formation of an emulsion is prevented. High washing efficiency is achieved using polymer solutions of viscosities lying between 10 and 100 cP.

The following variable conditions are of great importance for the optimum and complete removal of impurities and salts from the polymer solution by washing:

The loading capacity (m/h) may be varied between the limits of 10 and 20 m$^3$/h of total solution per m$^2$ of cross-section of the column.

The distance between the individual perforated bases should be between 5 and 15 cm.

Considering now the free surfaces of the perforated bases and the diameter of the perforations: These two parameters are of great importance in influencing the efficiency and feasibility of using the columns having perforated bases for the extraction of polymer solutions. In order to prevent an accumulation of the polymer solutions on the perforated bases, a free surface of more than 15 percent especially 20 percent and up to 30 percent is required, and the diameter of the perforations should be between 1.5 and 4.0 mm especially between 1.5 and 2.5 mm in order to ensure a fresh formation of surfaces without the droplets passing through the perforations without touching them. The shape of the perforations is of no particular importance, but circular or elliptical perforations were found to be the most suitable.

Considering now the lifting height and pulsating frequency: A large lifting height increases the residence time and hence the proportion of polymer solution in the continuous phase, but it has the same effect as an elevated pulsation frequency of breaking up the polymer droplets on the perforated bases. If the pulsation frequency is too low, the polymer solution remains on the perforated bases without passing through them. Suitable lifting heights are in the region of between 2 and 5 mm, and the pulsation frequency may be adjusted to values of between 50 and 300 strokes per minute. Optimum results are obtained with stroke frequencies of between 80 and 150 strokes per minute.

Considering now the difference in density between the polymer solution and the detergent solution, which is of great importance for the rate of sinking and the total residence time of the polymer solution in the detergent solution: To maintain a sufficiently high sinking velocity, differences in density of more than 0.1 g/cm$^3$ are generally sufficient, but polymer solutions which differ in density from the detergent solution by only 0.5 g/cm$^3$ can also be extracted if sufficiently large lifting heights and low stroke frequencies are employed.

Another important factor for the removal of the polymer solution by washing is the ratio by volume of the throughput of polymer solution to the detergent solution; this ratio may be varied within the limits of from 10:1 to 1:1.

Columns designed with perforated bases and equipped with pulsating devices are suitable for carrying out the process of the invention. Solvents which are not miscible with the polymer solution and which do not react with it are suitable for use as detergents. Dilute sodium hydroxide solution is preferably used for extracting acid substances, dilute phosphoric acid is used for extracting basic impurities and conductivity water is used for the extraction of salt.

EXAMPLES

A solution of polycarbonate in chlorobenzene/methylene chloride having a density of 1.21 g/cm$^3$ and a viscosity of 40 cP was used for the Examples. The polycarbonate solution contained from 0.2 to 1.0 percent of water with a chlorine ion concentration of 5 g of Cl$^-$/100 g of water.

COMPARISON EXAMPLE 1

The apparatus used was a column containing packing materials and having an effective height of 2,500 mm and a diameter of 100 mm. The following were used as packing material:
a. Saddle pieces, 5 mm, 10 mm
b. Raschig rings, 5 mm, 10 mm When attempts were made to extract the polycarbonate solution in counterflow with water, it was found that the polycarbonate solution remained in the upper zones of the layer of packing material. Extraction was not possible.

COMPARISON EXAMPLE 2

In a rotating column which had an effective height of 2,700 mm and a diameter of 35 mm and 50 whirling zones and 50 contact zones filled with 5 mm Raschig rings of V2A wire mesh, polycarbonate solution was extracted in counterflow with water at speeds of rotation of between 100 and 450 revs/min. Even when the rates of throughflow were only 4 liters of polycarbonate solution per hour and 1 liter of water per hour, no satisfactory extraction was found to take place.

In the conductivity test in which one part of the extracted polycarbonate solution and one part of conductivity water having a conductivity of < 0.1 · 10$^{-5}$ S/cm are thoroughly mixed for 5 minutes, the conductivity of the water was found to be greater than 5 · 10$^{-3}$ S/cm. The polycarbonate still contained 120 ppm of Cl$^-$ after the extraction test. The efficiency of the extraction also could not be improved by increasing the rate of stirring to about 1,000 revs/min. The polycarbonate solution emulsified at these high stirring speeds.

EXAMPLE 3

In a pulsating column with a perforated base which had an effective height of 2,200 mm and a diameter of 35 mm and contained 22 perforated bases having a perforation diameter of 2.0 mm and a free surface of 20 percent, 14 liters of polycarbonate solution per hour were extracted in counterflow with 2 liters of water per hour at a pulsation frequency of 140 strokes per minute and a lifting height of 5 mm.

The polycarbonate solution could be washed free from salt (less than 2 ppm Cl$^-$). A conductivity of $0.1 \cdot 10^{-4}$ S/cm was obtained in the conductivity test carried out according to Example 2.

EXAMPLE 4

In a pulsating column with perforated bases having an effective height of 3,000 mm and a diameter of 150 mm and containing 30 perforated bases with a perforation diameter of 2 mm and a free surface of 22 percent, the polycarbonate solution was extracted in counterflow with water at a ratio by volume of 2:1. With a loading capacity of 15 m$^3$/m$^2$/h, the ratio by volume of polymer solution to water in the column was varied by varying the stroke frequency while the lifting height was 3 mm.

a. 500 strokes per minute correspond to 0.2 part of polycarbonate solution in the washing liquid
b. 300 strokes per minute correspond to 0.12 part of polycarbonate solution in the washing liquid
c. 100 strokes per minute correspond to 0.05 part of polycarbonate solution in the washing liquid
d. 30 strokes per minute.

The extraction of the polycarbonate solution according to Example 4a with 60 ppm of Cl$^-$ in the polycarbonate and Example 4b with 10 ppm of Cl$^-$ in the polycarbonate was unsatisfactory, whereas the experiment according to Example 4c yielded a perfectly extracted polycarbonate (< 2 ppm Cl$^-$, conductivity test according to Example 2 < $0.1 \cdot 10^{-5}$ S/cm) with good technological properties. Experiment 4d remained without success. The polymer solution accumulated on the perforated bases.

We claim:

1. A process for the purification of polycarbonate polymer solutions by washing them with a detergent solution in pulsating columns having perforated bases, characterized in that a proportion by volume of the polymer solution to the detergent solution ≤ 0.1 is maintained in the extraction column and the detergent solution is used as the continuous phase.

2. A process according to claim 1, characterized in that the proportion by volume of the polymer solution in the detergent solution is regulated by the following means, alone or in combination:
   a. by varying the distance between the perforated bases,
   b. by varying the free surface of the perforated bases,
   c. by varying the pulsation frequency and lifting height,
   d. by varying the difference in density between the polymer solution and the detergent solution.

3. A process according to claim 1, wherein the polycarbonate solution is washed with dilute alkali solution, dilute acid and water.

4. A process according to claim 1, characterized in that the viscosities of the polymer solution are between 10 and 100 cP.

5. A process according to claim 1, characterized in that a pulsating column with perforated bases in which the distance between the perforated bases is from 5 to 15 cm and the perforated bases have a total open area of from 15 to 30 percent and a perforation diameter of from 1.5 to 4.0 mm, a lifting stroke frequency of from 50 to 150 strokes per minute and a lifting height of from 2 to 5 mm is used with a difference in density between the polymer solution and the detergent solution of >0.1 g/cm$^3$ and a proportion by volume of the polymer solution to the detergent solution within the limits of from 10:1 to 1:1 under a load of from 10 to 20 m$^3$/m$^2$/h.

* * * * *